July 8, 1947.                     C. W. HART                    2,423,702
         MOLDED BLOCK OF ACTIVATED CARBON IN A POROUS
                   CASING OF FIREPROOFED CARBON
                      Filed Sept. 20, 1944
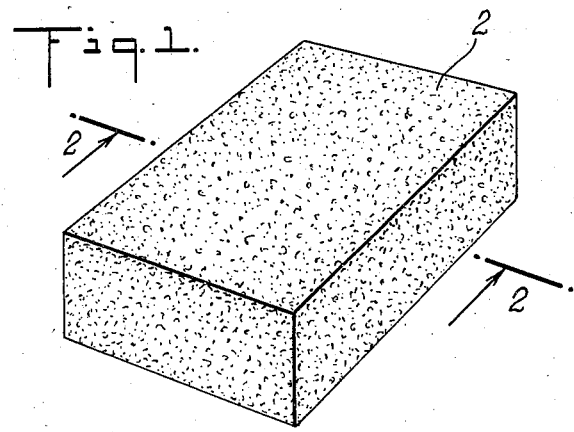
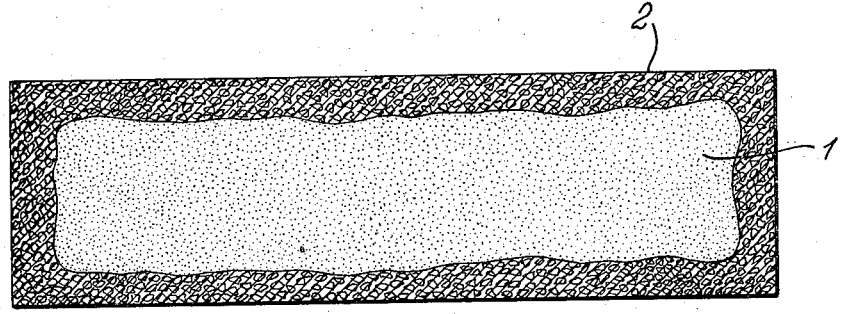
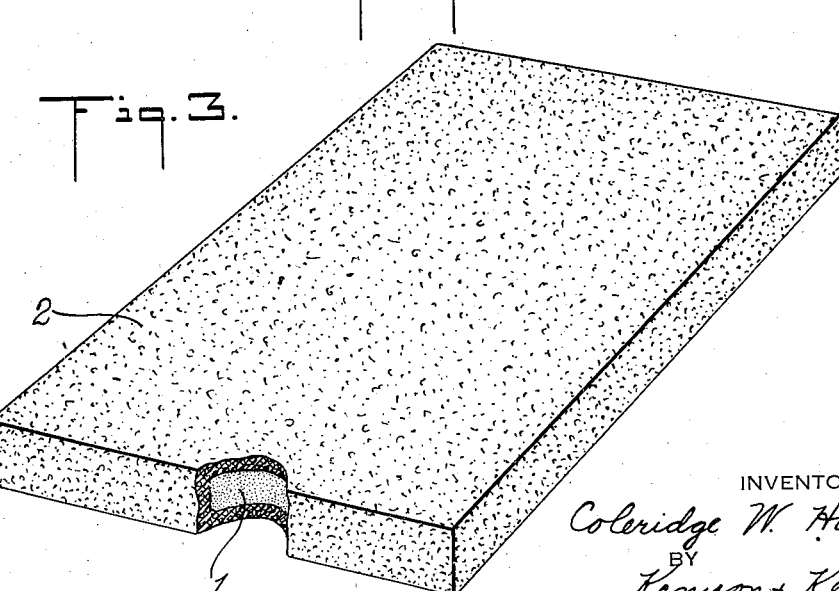
INVENTOR
Coleridge W. Hart
BY
Kenyon & Kenyon
ATTORNEYS Patented July 8, 1947

2,423,702

UNITED STATES PATENT OFFICE 2,423,702

MOLDED BLOCK OF ACTIVATED CARBON IN A POROUS CASING OF FIREPROOFED CARBON

Coleridge W. Hart, Peekskill, N. Y.

Application September 20, 1944, Serial No. 555,020

1 Claim. (Cl. 252—265)

This invention relates to absorbent materials particularly enclosed in a casing or shell. It has particular reference to certain classes of absorbing or adsorbing materials as carbon in various forms, such as charcoal and infusorial earths and other like substances used for absorption or adsorption of odorous, gaseous fumes and vapors from the atmosphere, and for like purposes.

The invention finds particular application in connection with refrigerators, cold storage rooms, smoking rooms, kitchens, restaurants and the like.

Heretofore when such materials have been used in finely-divided, granular or powdered form, it has been necessary to enclose them in containers made of metal, cardboard, Bakelite, vulcanized fiber, hard rubber, etc., having openings or perforations to permit the free flow of air or liquid through them to contact the absorbent material. The disadvantages of containers made of such materials have been that, in moist atmospheres or in use in liquids, many of the metals are subject to rust and practically all of them become corroded because of the formation of electric couples when used with activated carbons while cardboard disintegrates. Also, reactivation of the absorptive material for re-use by baking to expel occluded gases is impossible because the heat injures or destroys containers made of many of the above materials. Also, no matter which of such materials is used, because of the necessary openings, the heat ignites or injures the absorptive material. Additionally, containers made of any one of the above materials require, as noted, openings which preclude the use of an adsorbent in its most advantageous forms, granulated or powdered, because of consequent sifting through the container.

In order to obviate the disadvantages in the use of divided adsorbents held in perforated containers made of the above materials, it has been proposed to work the absorbents up into rigid form such as in briquettes to be used either with or without containers. But this procedure also has its drawbacks because of the necessity of mixing the absorbent material with binders such as pitches or resins which greatly reduce the absorptive efficiency of the material by clogging its pores and covering their surfaces.

Accordingly, it is an object of my invention to provide as an article of manufacture absorbent materials of the nature indicated in finely-divided, granular, or their most effective or powdered form contained in a shell or casing which will not rust, corrode or disintegrate because of moisture, water or liquid.

Another object of the invention is to provide in such article a casing which is fireproof, which will not itself be injured by heat anad which will prevent ignition or injury by heat of or to the absorbents, thus permitting reactivation and economical re-use.

Another object is to provide such a casing which will not require openings or perforations therein so that absorbent materials, however finely-divided as in granulated or in the most advantageous form, that is powdered, presenting the greatest possible adsorptive surface may be used without sifting through the container.

Another object is to provide in such an article a shell, casing or container which is to some extent absorbent in itself.

Another object is to eliminate in such an article the necessity of mixing the absorbent materials enclosed in the casing with efficiency reducing binders.

While the invention applies equally to materials of the kind used for absorption, adsorption, purification, decolorization, etc., for convenience and in no sense of limitation I will hereafter designate this entire class of materials as absorption materials, because uniformly in the various processes or methods where such substances are employed they accept, acquire or take into their structure some other material to be abstracted during the process, such as a gas occluded within the pores of the adsorbing material in the case of adsorption.

Further objects will appear from the following description, reference being made to the accompanying drawings which show one embodiment of my invention in which:

Figure 1 is a perspective view of the absorbent material enclosed in its shell or casing in block form;

Fig. 2 is a cross-sectional view on line 2—2 of Fig. 1; and

Fig. 3 is a perspective view partly broken away of the absorbent material and its enclosing shell or casing in board or panel form.

According to my invention, I enclose a quantity of finely-divided, granulated or powdered absorbent material in a casing or shell of fireproof carbon.

The embodiment of the preferred form of my invention shown in Figs. 1 to 3 inclusive is constructed as follows:

A quantity of activated charcoal which has been fireproofed is pulverized to 50 mesh and compounded with dry pitch having a melting point of 185° F. and infusorial earth in the following proportions:

| | Per cent |
|---|---|
| Activated fireproofed charcoal | 56⅔ |
| Pitch | 33⅓ |
| Infusorial earth | 10 |

These ingredients may be milled separately or collectively, but as a matter of general practice, they are milled collectively so as to avoid a separate mixing operation.

Then a certain measure or weighed quantity of this compound equivalent to about one-third of the total block as in Figs. 1 and 2 or panel as in Fig. 3 to be manufactured is introduced with a scoop or from a hopper into the bottom of the mold or die of a compressing machine.

A weighed or measured quantity of powdered activated charcoal equivalent to about one-third of the total block or panel to be made is then introduced into the center of the mold or die in such a manner that it does not reach the edges of the die. The activated charcoal can be inserted as by means of a semicircular oblong cylinder arranged on a spindle or rod in such a way that, when filled with activated charcoal and placed above the depression in the die and then turned over, it makes a hole in the fireproof charcoal already placed in the bottom of the die, and at the same time dumps the activated charcoal into the hole, thus placing it in the exact center of the block or panel.

Thereupon the remaining one-third of the die is filled up with the fireprofed charcoal mixture and the mass of material then compressed or molded into the desired form as a block or panel.

The molded blocks, Figs. 1 and 2, or panels Fig. 3, are then baked or calcined in a batch oven or a continuous process oven for about one hour at a temperature starting at about 300° F. and gradually increasing during the hour to 425° F. The baking carbonizes the pitch by driving off its volatile matter, makes a porous mass 2 around the powdered charcoal 1 within by extrusion of the pitch gases, and hardens the enveloping mass into a solid but porous casing or shell.

An activated fireproofed carbon that may be used in practising this invention is described in Spowers Patent No. 2,092,595. Other activated fireproofed carbons may be used.

It will be seen that the block or panel thus produced makes available for absorption a quantity of activated charcoal 1 in its most advantageous or powdered form to present an enormous absorbent surface and unmixed with a binder which would reduce its absorbent activity. And also, that the absorbent charcoal 1 is adequately contained and protected in a casing 2 which is porous, impervious to moisture, water or other liquid and heat, which in itself is somewhat absorbent and which will not permit sifting of the activated charcoal through it.

When a block or panel is in use, as for deodorization of a refrigerator, odorous gases penetrate the porous outer shell and are absorbed by the powder activated charcoal within it. When, in the course of time, the powdered charcoal becomes saturated with occluded gases, and as does to a less extent the casing itself, a block or panel may be economically reactivated for re-use by merely placing it in an oven or the like and baked to expel the occluded gases. Here, again, because the casing is composed basically of fireproofed carbon, there is no danger that either the powdered carbon within it will ingite or that the casing itself will ignite or be injured by the heat.

While the invention has been disclosed herein in an embodiment at present preferred for illustrative purposes, it is obvious that changes in materials employed, construction and form may be made without departing from the scope of the invention. Thus the article may be made in other shapes and dimensions as tablets, rods, cones, cylinders, spheres, sheets, or panels, etc. Again, the activated charcoal may be granulated rather than pulverized. Also, infusorial earth or silica gel or other absorbent materials may be used as the absorbent material within the casing, rather than activated charcoal.

In forming the casing, the proportions of infusorial earth, fireproofed charcoal and pitch may be varied depending on the types of infusorial earth, charcoal and pitch used and the degree of porosity desired. The greater the proportion of binder as pitch, the greater the porosity; the greater the proportion of infusorial earth, the less the porosity. The proportion of pitch may vary from 10% to 40%; the proportion of infusorial earth from 2% to 20% with the necessary changes in the proportions of charcoal. Kieselguhr or diatomaceous earth or other spongy materials may be used rather than infusorial earth. Artificial resins may be used as a binder rather than pitch. Also, the fireproofed charcoal used may be pulverized to other meshes than the one specified, depending on the density desired.

The activated charcoal may be inserted by means of a draw slide device which dumps the correct amount of activated charcoal into the center of the die. Furthermore, the activated charcoal having been moistened so as to be compressible can be inserted in the form of small cakes. It is to be understood that the quantity of activated charcoal enclosed in the container may be increased or decreased as found advisable without departing from the scope of my invention.

I do not wish, therefore, to be limited to the precise details of ingredients, construction and method of construction set forth, but desire to avail myself of such variations and modifications as come within the scope of the appended claim.

I claim:

As an article of manufacture, a body of finely-divided activated carbon enclosed in a porous casing composed of a mixture of activated fireproofed carbon, carbonized pitch freed of volatile matter, and infusorial earth.

COLERIDGE W. HART.

REFERENCES CITED

The following references are of record in the file of this patent:

UNITED STATES PATENTS

| Number | Name | Date |
|---|---|---|
| 875,355 | Knight | Dec. 31, 1907 |
| 661,056 | Jolles et al. | Nov. 6, 1900 |

FOREIGN PATENTS

| Number | Country | Date |
|---|---|---|
| 1,415 | Great Britain | 1884 |